July 13, 1926.
G. A. BUEHLE
1,592,441
HYDRAULIC TURBINE
Filed May 19, 1925
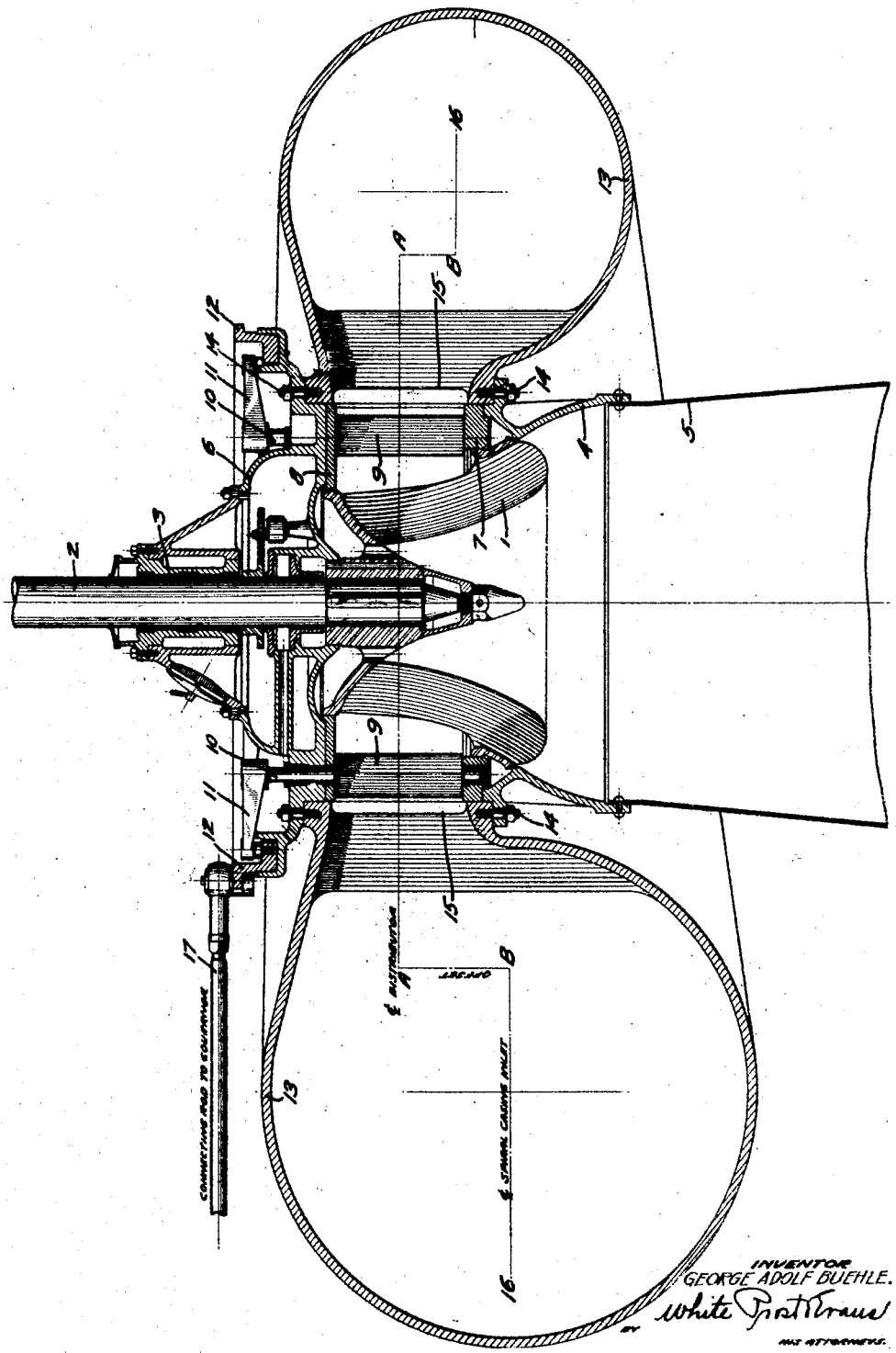
INVENTOR
GEORGE ADOLF BUEHLE.

Patented July 13, 1926.

1,592,441

UNITED STATES PATENT OFFICE.

GEORGE ADOLF BUEHLE, OF SAN FRANCISCO, CALIFORNIA, ASSIGNOR TO PELTON WATER WHEEL CO., OF SAN FRANCISCO, CALIFORNIA, A CORPORATION OF CALIFORNIA.

HYDRAULIC TURBINE.

Application filed May 19, 1925. Serial No. 31,270.

This invention relates to hydraulic turbines, and has for its object the provision of an improved device of this character. More particularly this invention relates to turbines of this character wherein a centrally located runner of any suitable type, such as a Francis runner, is positioned within a spiral metallic casing, the passage of the water from the spiral casing to the runner being controlled by a series of guide vanes or gates which are operated by means of a shift ring. By metallic casings, I refer to spiral casings made of any cast metal or fabricated from plate metal. Heretofore it has been the practice to position the outlet passage from such spiral casing to the runner so that the central axis within the spiral casing lies in a plane which passes substantially through the middle portion of the guide vanes, or above said middle portion where a vertical type of runner is employed, which resulted in a construction having a central depression on the side of the casing opposite the draft tube. In such an arrangement the gate controlling mechanism was located in said central depression or hollow which resulted in a very inconvenient arrangement and introduced numerous complications, particularly where a governor was employed to operate the guide vanes for the purpose of speed control. Such a construction required special extensions on the guide vane mechanism to permit the governor being connected at a point above the height of the spiral casing. These extensions involved additional weight and further complications in several directions, such for instance as extensions to the guide vane spindles, additional bearings for the spindles by reason of the extensions, greater height of the shifting ring and inaccessibility of the main bearing, gland or stuffing box.

An object of the invention is to provide means whereby these undesirable features are eliminated.

Another object of the invention is to provide a spiral metallic casing having its inlet portion offset with respect to its outlet passage on the side adjacent the draft tube.

Another object of the invention is to provide a turbine of the character described wherein the horizontal axis of the spiral metal casing is positioned below the middle portion of the guide vanes or gates.

Another object of the invention is to provide a spiral metal casing having its outlet passage to the guide vanes above the horizontal axis of the spiral casing and adjacent the side supporting the guide vane operating mechanism.

Another object of the invention is to provide a turbine wherein the outlet from the spiral metal casing to the guide vanes is so positioned as to substantially eliminate a central depression on the side of the casing opposite the draft tube.

A still further object of the invention is to provide a novel construction whereby the guide vanes or gate operating mechanism may be supported directly on the turbine in a position extending above the height of the draft tube without the employment of extensions and other additional parts.

The invention possesses other advantageous features, some of which with the foregoing will be set forth at length in the following description, where I shall outline in full that form of the invention which I have selected for illustration in the drawings accompanying and forming part of the present specification. In said drawings I have shown a form of device embodying my invention but it is to be understood that I do not limit myself to this particular form, since the invention as set forth in the claims may be embodied in a plurality of other forms.

In the drawings, the figure shows a central vertical section, with parts in elevation, of a turbine embodying my invention.

Referring to the drawings, in which 1 indicates a runner, a Francis type being shown, supported on a vertical shaft 2. It is, of course understood that the invention is neither limited to a Francis type of runner nor to a vertical type of turbine. The shaft 2 is journaled in suitable bearings 3 and supports the runner 1 in a suitable metal casing comprising a lower part 4 which leads to a draft tube 5 and an upper part 6 which supports the guide vane operating mechanism, more fully described hereinafter. The distributor includes a lower ring 7 adjacent part 4, an upper ring 8 adjacent part 6 and a series of guide vanes or gates 9, positioned between said rings 7 and 8, concentrically arranged about the runner 1 in the usual manner. The guide vanes 9 are each shown as having a spindle 10, the lower end of which is journaled in ring 7 and the upper end of which extends through ring 8 and upper part 6. The upper end of each spindle is provided with a crank arm 11 which arms are pivotally connected with a shift ring 12, suitably supported by the part 6 in a well-known manner. A spiral casing 13 surrounds the units described and is suitably secured thereto such as by bolts 14 as shown. The spiral casing 13 is made of any cast metal or fabricated from plate metal. As above indicated, the invention is particularly directed to casings of this character. The outlet passage of the spiral casing, that is, the passage leading from the spiral casing to the distributor, indicated at 15, is offset with respect to the axis or center line of the spiral casing, indicated at 16. A line drawn through the center of outlet 15 passes through the center or middle portion of the guide vanes 9 as indicated by the line A—A, and is offset with respect to the spiral casing center 16 as indicated by the line A—B. From this it will be seen that the main body of the spiral metal casing is below the outlet portion thereof, thereby greatly reducing the depression on the side thereof opposite the draft tube or discharge side, which supports the guide vane operating mechanism. This of course is the upper side in the vertical type of turbine as shown in the drawings. By this arrangement, extensions on the guide vane mechanism and the other resulting complications above set forth are eliminated. The guide vanes 9 are operated by shifting the ring 12 in a well understood manner thereby regulating the passage of water from the spiral casing to the turbine runner. For automatic regulation, the shift ring 12 may be connected with a governor or other suitable speed control device, by any convenient means, such as a connecting rod 17.

What I claim and desire to secure by United States Letters Patent is:

1. A device of the character described, a spiral metal casing having its inlet passage offset toward the discharge side of the turbine with respect to its outlet to the turbine runner.

2. A turbine comprising a runner, guide vanes for controlling the passage of water thereto and a spiral metal casing having the axis of its inlet passage positioned below the middle of said vanes toward the discharge side of the turbine.

3. A turbine comprising a runner, guide vanes for controlling the passage of water thereto, and a spiral metal casing having an outlet adjacent said guide vanes and an inlet passage offset with respect to said outlet toward the discharge side of the turbine.

4. In a turbine comprising a runner, guide vanes and mechanism for controlling the same, a spiral metal casing having its outlet to said vanes offset with respect to its spiral passage so as to form a bed for supporting said controlling mechanism free of the walls of said casing in a horizontal plane.

5. A turbine comprising a runner, guide vanes, means for controlling said vanes, and a spiral metal casing formed with a relatively deep depression on the discharge side of the turbine and a relatively shallow depression on the opposite side for supporting said controlling means free of the walls of said casing in a plane at right angles to the runner axis.

6. A turbine comprising a runner, guide vanes for controlling the passage of water thereto, means for operating said vanes, and a spiral metal casing having its outlet adjacent said vanes and its inlet passage offset toward the discharge side of the turbine, so as to form a bed for supporting said operating means above the casing in a plane at right angles to the runner axis.

7. A turbine comprising a runner, a spiral metal casing having an inlet passage offset with respect to its outlet so as to form a shallow depression on the side opposite the discharge side of the turbine, guide vanes adjacent the outlet of said casing, and means for controlling said guide vanes positioned in said shallow depression of the casing.

In testimony whereof, I have hereunto set my hand.

G. ADOLF BUEHLE.